(12) United States Patent
Spitzer-Williams et al.

(10) Patent No.: US 8,005,856 B2
(45) Date of Patent: Aug. 23, 2011

(54) DYNAMIC SELECTION OF MEDIA FOR PLAYBACK

(75) Inventors: Noah Spitzer-Williams, Seattle, WA (US); Ryan D'Aurelio, Seattle, WA (US); Jennifer Waters, Redmond, WA (US); Mark Mackenzie, Seattle, WA (US); Steve Moreland, Mountlake Terrace, WA (US); Marc Oshiro, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 557 days.

(21) Appl. No.: 12/146,226

(22) Filed: Jun. 25, 2008

(65) Prior Publication Data

US 2009/0327222 A1    Dec. 31, 2009

(51) Int. Cl.
*G06F 3/00*    (2006.01)
*G06F 17/30*    (2006.01)
(52) U.S. Cl. ........................................ 707/769; 707/913
(58) Field of Classification Search .................. 707/913, 707/769
See application file for complete search history.

(56) References Cited

U.S. PATENT DOCUMENTS

| | | | |
|---|---|---|---|
| 6,526,411 | B1 | 2/2003 | Ward |
| 7,136,874 | B2 | 11/2006 | Mercer et al. |
| 7,734,688 | B2 * | 6/2010 | Langdon ...................... 709/203 |
| 2004/0197084 | A1 | 10/2004 | Tagawa et al. |
| 2006/0168340 | A1 | 7/2006 | Heller et al. |
| 2006/0218187 | A1 | 9/2006 | Plastina et al. |
| 2006/0265421 | A1 | 11/2006 | Ranasinghe et al. |
| 2007/0168388 | A1 | 7/2007 | Plastina et al. |
| 2007/0233740 | A1 | 10/2007 | Nichols et al. |
| 2008/0091771 | A1 | 4/2008 | Allen et al. |
| 2009/0177654 | A1 * | 7/2009 | Beaupre et al. ................... 707/5 |

OTHER PUBLICATIONS

Schramm, How to: Create a smart podcast playlist in iTunes, Feb. 1, 2008, pp. 1-15.*
Harrison, Organize and transfer music and movies to portable media devices with Windows Media Player 10, Mar. 30, 2006, pp. 1-3.*
Samuels, The Other Media Player, 2000, pp. 1-15.*
Winamp Forums, May 24, 2006, pp. 1-10.*
All About Windows SP Media Center Edition, http://catalogimages.wiley.com/images/db/pdf/0764543571.excerpt.pdf.
First Steps with Your Zune, http://media.wiley.com/product_data/excerpt/52/04701204/0470120452.pdf.
Installation and Setup, Part 1, http://media.wiley.com/product_data/excerpt/22/07821438/0782143822-2.pdf.

* cited by examiner

*Primary Examiner* — Shahid A Alam
*Assistant Examiner* — Albert Phillips
(74) *Attorney, Agent, or Firm* — Vierra Magen Marcus & DeNiro LLP

(57) ABSTRACT

A list of media, such as image media, is dynamically generated and provided to a user. The dynamically generated media playlist may be associated with a user's "favorite pictures," "favorite music" or some other type of media. Each of the "favorite media" features may be associated with playlist criteria, which is used to dynamically construct a query for media files to include on the playlist. The criteria may specify several requirements for including media in the dynamically created playlist, for example user rating, recently added media, and other criteria. The query is sent to a database, which returns a playlist of media. The returned playlist is provided to a media center, which retrieves and provides the listed media to a user.

12 Claims, 17 Drawing Sheets

Audio file table

| ID | Date Added | Title | Artist | Album | Rating | Play count |
|---|---|---|---|---|---|---|
| 0001 | 2008.01.04 | Mixed Bizness | Beck | Midnight Venture | 4 | 013 |
| 0002 | 2008.01.06 | I Will Follow | U2 | Boy | 5 | 012 |
| 0003 | 2008.02.04 | Are you Gonna Go my Way | Lenny Kravitz | Are you Gonna Go my Way | null | 024 |
| 0004 | 2008.03.04 | American Idiot | Green Day | American Idiot | null | 002 |
| 0005 | 2008.03.04 | Oak tree | Tree Farm | On the Farm | 2 | 001 |

Figure 3

Image file table

| ID | Date Added | Filename | Rating | Location |
|---|---|---|---|---|
| 0001 | 2008.02.03 | yosemitepark01 | 4 | k:documents/pictures |
| 0002 | 2008.02.03 | yosemitepark02 | 2 | k:documents/pictures |
| 0003 | 2008.02.13 | AmandaBirthday | 5 | k:documents/pictures |
| 0004 | 2008.03.02 | familyBBQ | null | k:documents/pictures |

Figure 4

DYNAMIC SELECTION OF MEDIA FOR PLAYBACK

BACKGROUND

Currently, users can store, playback and manage media files, such as digital pictures and music files, on their home computers using any of several available applications. These applications allow users to organize a playlist of songs or a slide show of images, as well as allow users to playback any song or display an image individually. Some existing music player applications allow users to play a list of songs that they didn't explicitly create, such as songs in a particular genre, a user's top rated songs, recently added songs, recently played songs, or a certain number of the most played songs.

SUMMARY

The technology described herein pertains to dynamically determining a list of media to provide to a user. The media provided may be associated with a "favorites" media list generated in response to user input. For example, the dynamically determined media list may be associated with a user's "favorite music," "favorite pictures" or some other type of media. To determine and dynamically provide the media list, an event occurs which triggers providing media to the user. In response to the event, a favorite media setting is identified to determine the type of playlist to generate. When a dynamic playlist is to be determined, a query is generated from dynamic playlist criteria and sent to a database. The query returns a list of media which is retrieved and provided to a user.

A dynamic playlist may be created for a user's image files. A dynamic image file playlist may have criteria of user rating, whether or not an image is unrated, and a time period threshold criteria. A user rating criteria for image files indicates the minimum or maximum user rating that an image file must have to be included in the image or playlist. An unrated criteria indicates whether images with no rating are included in the image playlist. A time period threshold criteria indicates a time during which images added to a database are included in the images playlist. In addition to image files, a dynamic playlist may also be created for a user's audio files.

An embodiment provides image media files by setting several criteria for identifying one or more image files to add to a list. The first criteria identifies image files having a user-created rating that satisfies a threshold. The second criteria identifies image files not rated by a user. The third criteria identifies image files added to a database during a specified period of time. A query is then constructed based on the three criterion and images in a set of query results are provided to a user.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 3 illustrates an example of a table with audio data.

FIG. 4 illustrates an example of a table with image data.

DETAILED DESCRIPTION

Figure 1:
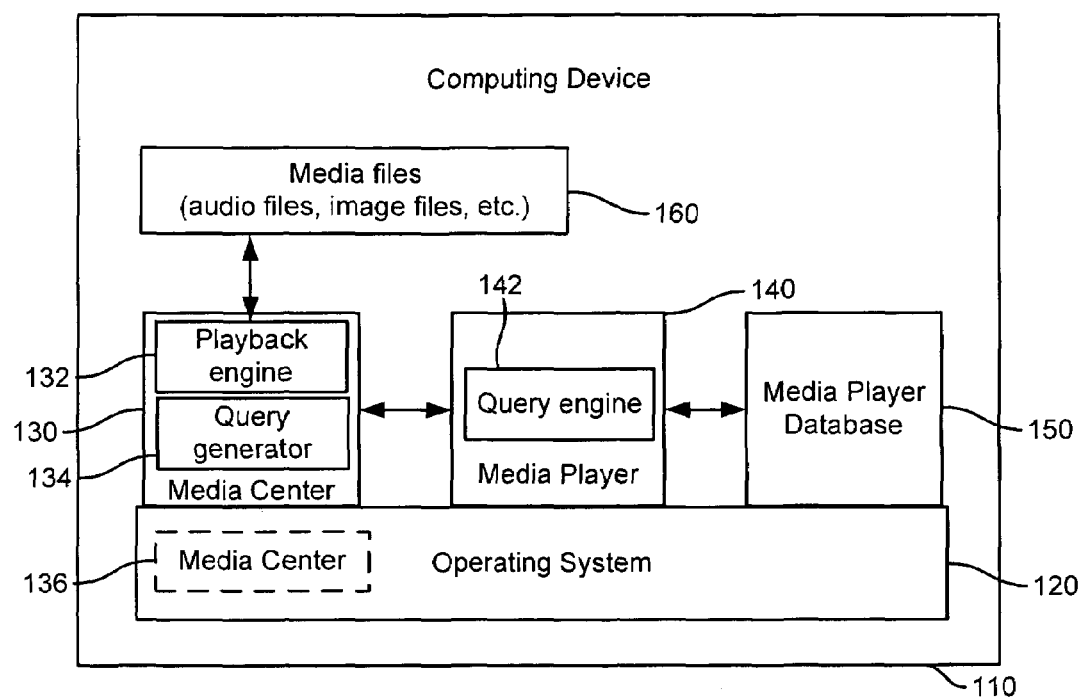
FIG. 1 illustrates a block diagram of an embodiment of a system for providing a set of media files on a computing device.

The present technology, roughly described, dynamically determines a list of media for a user. The media provided may be associated with a "favorite" media list for the user. For example, the dynamically determined media list may be associated with a user's "favorite music," "favorite pictures" or some other type of media. To determine and dynamically provide the media list, an event occurs which triggers providing media to the user. In response to the event, a favorite media setting is identified to determine the type of playlist to generate. When a dynamic playlist is to be determined, a query is generated from dynamic playlist criteria and sent to a database. The query returns a list of media which is retrieved and provided to a user.

A dynamic playlist may be created for a user's image files. A dynamic image file playlist may have criteria of user rating, whether or not an image is unrated, and a time period threshold criteria. A user rating criteria for image files indicates the minimum or maximum user rating that an image file must have to be included in the image or playlist. An unrated criteria indicates whether images with no rating are included in the image playlist. A time period threshold criteria indicates a time during which images added to a database are included in the images playlist. Dynamic playlist criteria for image media files are discussed in more detail below.

A dynamic playlist may also be created for a user's audio files. A dynamic playlist for audio files may criteria including a user rating, automatic rating, most recently added and time period threshold criteria. A user rating criteria specifies the minimum or maximum user rating the audio file must have for it to be included in the playlist. An auto-rating criteria indicates the minimum or maximum automatically determined rating an audio file must have to be included in the playlist. In some embodiments, the automatic rating indicates how frequently the media is accessed, for example how frequently an audio file or song is played. The most recently added criteria may specify the number of most recently added audio files to add to the playlist. For example, for a most recently added criteria value of fifty, the fifty most recently added audio files will be included in a user's favorite music playlist. A time period threshold criteria indicates a period of time during which audio files added are included in the music playlist. For example, for a time period criteria value of thirty days, every audio file added within the last thirty days will be included in the music playlist. Dynamic playlist criteria for audio media files are discussed in more detail below.

A dynamic playlist may also be created for other types of media files, including video files. Dynamic playlists for other media files such as video files may be implemented similar to those of either image files or audio files.

In some embodiments, a media playlist may be dynamically determined, and the media will be provided in response to any of several events, including selecting a "favorite music" or "favorite picture" button, providing other media, screensaver events, or some other event. In some embodiments, a "Favorite Music" or "Favorite Pictures" button may be located within an interface provided by an operating system or somewhere else within an operating system or application. In some embodiments, a favorite media list may be provided in response to selection of a "Favorite Music" or "Favorite Pictures" button provided within a startup menu of "Windows" operating system software, provided by Microsoft Corporation of Redmond, Wash. In some embodiments, music may be provided during a user initiated slideshow or during the viewing of another image. In some embodiments, images may be provided during user initiated audio file playback, as a screensaver, or in response to some other event.

FIG. 1 illustrates a block diagram of an embodiment of a system for providing a set of media files on a computing device. The system of FIG. 1 includes a computing device 110 having operating system 120, media center 130, media player 140, media player database 150 and media files 160. Operating system 120 may serve as a computer's master control program, may communicates over a network (not illustrated in FIG. 1) in response to user input as well as other events, controls hardware devices connected to computing device 110, and allows other application programs to be executed on the computing device.

Media center 130 may be an application, object, or other collection of code that implements functions and features which provide a media experience to a user. In some embodiments, media center 130 may be implemented as an application which runs on operating system 120. In some embodiments, the media center code may be implemented as part of the operating system 120, such as for example as media center 136. Media center 130 (and media center 136) may include playback engine 132 and query generator 134. Particular references throughout this discussion to one of media centers 130 or 136 are for exemplary purposes only, and either of media centers 130 or 136 are intended to implement the present technology, provide generally equivalent functionality, and include a playback engine and query generator. Media center 130 may communicate with operating system 120, media player 140, may access, read and write to media files 160, and optionally communicate with media player database 150 (not illustrated in FIG. 1).

Playback engine 132 may receive a list of media and optimally other data from media center 130, retrieve the media, and provides the media through an interface on computing device 110 or an external device. Playback engine 132 may provide several types of media, including audio files, image files, video files and other types of media. In some embodiments, playback engine 132 is implemented by media player 140. In this embodiment, the system retrieves a list of audio files from media player's query engine and then send the retrieved list back to the media player 140 (playback engine) to be played. Though references to a playback engine 132 within media center 130 may be referenced below, it is intended that media player 140 may be substituted for playback engine 132 within media center 130

Query generator 134 may generate a query based on a playlist setting. The playlist setting may be stored within media center 130, or optimally somewhere else within computing device 110. In some embodiments, query generator 134 generates a query from criteria associated with a dynamic playlist. Generating a query is discussed in more detail below.

Media player 140 may access and provide media through an interface and includes query engine 142. Media player 140 may access media from media player database 150, play audio files and display images, and respond to queries received from media center 130. Media player 140 may communicate with media center 130, media player database 150, operating system 120, and may access, read and write to media files 160.

Query engine 142 may query media player database 150 based on query data generated internally or received from media center 130. Media player 140 may communicate with media center 130 and media player database 150.

Media player database 150 communicates with media player 140 and may include one or more tables having data for one or more media types. In some embodiments, each table may include data stored for a particular user or account. Examples of tables containing media data are illustrated and discussed below with respect to FIGS. 3-4. Media player database 150 may communicate with media player 150, operating system 120, and may access, read and write to media files 160.

Computing device 110 also includes media files 160, which may include audio files, image files, video files and other types of media. In some embodiments, the audio files may include files of mp3, wma, and other formats. Image files may have formats of jpeg (or jpg), gif, tiff, bmp, and other formats. Video files may have a format of wmv, .wav, mpeg and other formats. Media files 160 may be accessed by media center 130, media player 140, media player database 150, and operating system 120.

Figure 2:
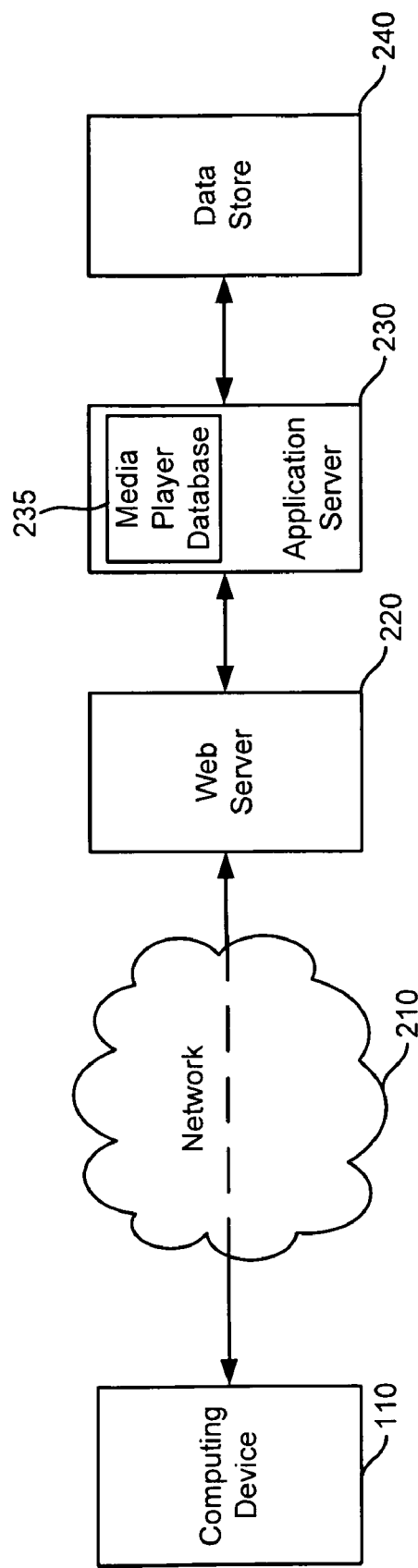
FIG. 2 illustrates a block diagram of an embodiment of a system for providing a set of media files over a network.

FIG. 2 illustrates a block diagram of an embodiment of a system for providing media files over a network. The system of FIG. 2 includes computing device 110, network 210, web server 220, application server 230, and data store 240. Network 210 may be implemented as the Internet or other WAN, a LAN, intranet, extranet, private network or other network or networks.

The system of FIG. 2 provides for implementing media player database 150 of FIG. 1 over network 210 in FIG. 2. In particular, a media player database is implemented as media player database 235 on application server 230. In any case, the database may be accessed by media center 130 or 136 on computing device 110 over network 210 through requests to web server 220. In response to a request to query a media center database, web server 220 will forward the request to application server 230. Application server 230 may process the request. The response with query results is eventually provided by web server 220 to computing device 110, where the query results include a list of media corresponding to the query originally sent by computing device 110.

In some embodiment, the media player database resides on client 110 and can has information to locate \files located on any other devices located on the network. However, the media player database is still local to client 110.

Particular references throughout this discussion to one of a particular media player database are for exemplary purposes only, and any of exemplary media player databases 150, 230 or 240 are intended to implement the present technology, provide generally equivalent functionality, and be accessed by a media center application or media player module.

FIG. 3 illustrates an example of a file table with audio data. The table of FIG. 3 may be included within any of the exemplary media player databases discussed above and be queried for a list of one or more audio files. In some embodiments, additional columns may be included within the table of FIG. 3, such as for example audio file location, which indicates the local or remote location of a particular audio file.

The table includes columns of Identifier, Date Added, Title, Artist, Album, Rating and Play Count, and five records of data. The first data record has an identifier of 1, date added of Jan. 4, 2008, title of Mixed Business, artist of Beck, album of Midnight Venture, user rating of 4, and a play count of 13. The next data record includes an identifier of 2, date added of Jan. 6, 2008, a title of I Will Follow, artist of U2, album of Boy, rating of 5, and a play count of 12. The next record includes an identifier of 3, date added of Feb. 4, 2008, a title of Are You Gonna Go My Way, artist of Lenny Kravitz, album of Are You Gonna Go My Way, rating of null, and a play count of 24. The fourth data record includes an identifier of 4, a date added of Mar. 4, 2008, a title of American Idiot, an artist of Green Day, an album of American Idiot, a user rating of null, and a play count of 2. The last record in the database of FIG. 3 includes an identifier of 5, date added of Mar. 4, 2008, a title of Oak Tree, an artist of Tree Audio file, album of On the Farm, a rating of 2, and a play count of 1. Querying the table of audio data is discussed in more detail below.

FIG. 4 illustrates an example of a table with image data. In some embodiments, the table of FIG. 4 may be included within a media player database within the system of FIG. 1 or FIG. 2. The table of FIG. 4 includes columns of Identifier, Date Added, File Name, User Rating, and Location, though other columns may be included within the table. Querying the database of image data is discussed in more detail below.

The data included in the table of FIG. 4 includes four records, the first of which includes an identifier of 1, a data added of Feb. 3, 2008, a file name of yosemitepark01, and user rating of 4. The second record includes an identifier of 2, a date added of Feb. 3, 2008, a file name of yosemitepark02, and a user rating of 2. The third record includes an identifier of 3, a date added of Feb. 13, 2008, a file name of Amanda-Birthday, and a user rating of 5. The last record includes an identifier of 4, a date added of Mar. 2, 2008, a file name of familyBBQ, and a user rating of null. Each of the four records has the same location of k:documents/pictures.

Figure 5:
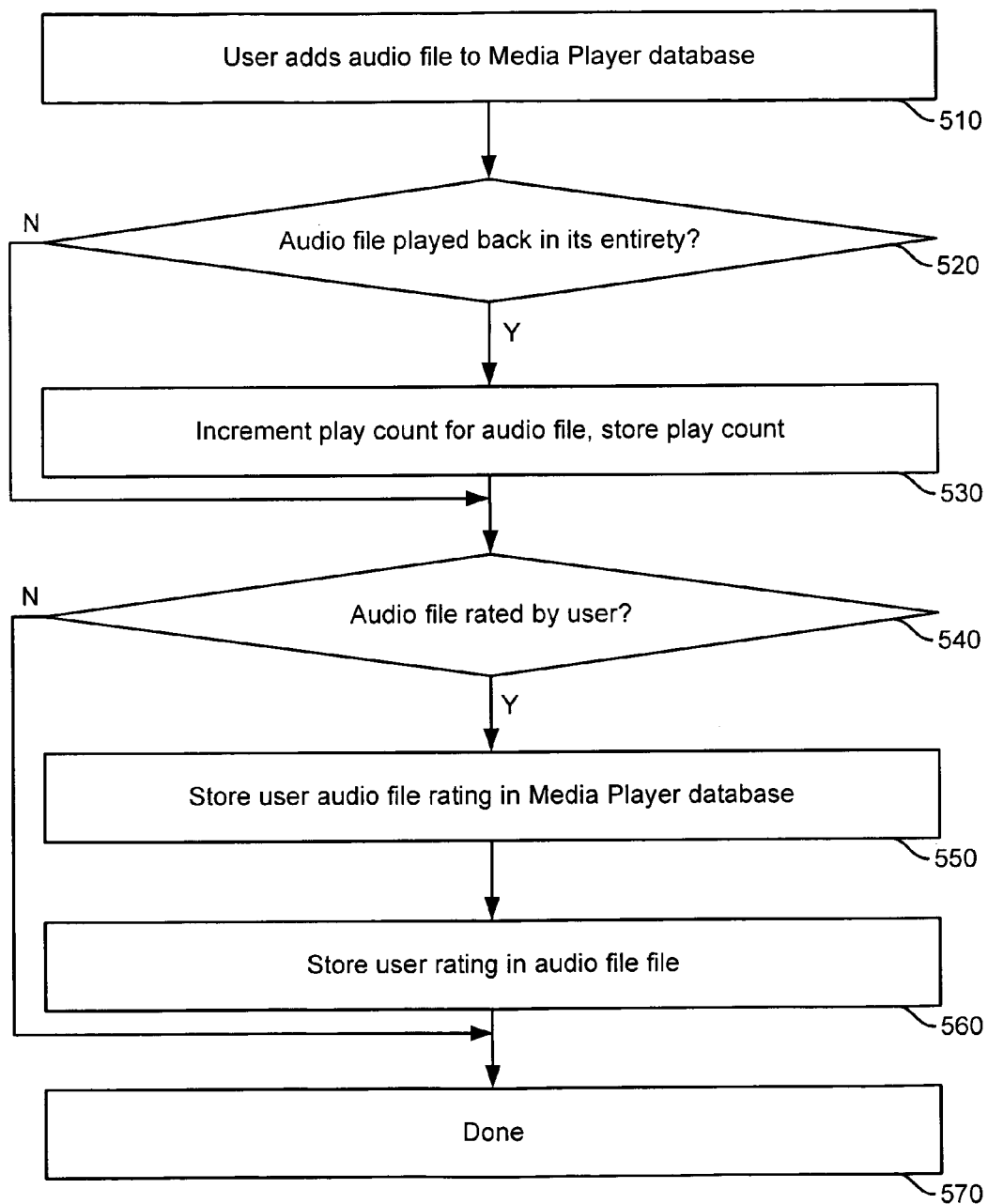
FIG. 5 illustrates a flowchart of an embodiment of a method for creating dynamic playlist data for audio files.

FIG. 5 illustrates a flowchart of an embodiment of a method for creating data used to evaluate dynamic playlist criteria audio files. The method involves monitoring user behavior and collecting data regarding user behavior with respect to audio files. The steps of FIG. 5 may be performed at any time, and in any order. In some embodiments, the method of FIG. 5 can be performed by media player 140, media center 130 or a combination of both.

The method begins when a user adds audio files to media player database 150 at step 510. The user may add audio files to a media player database by playing an audio file using media player 140, ripping an audio file from a compact disc to computing device 110, using media player 140 in some other aspect with respect to an added audio file, or in some other manner.

A determination is made as to whether a particular audio file is played back in its entirety at step 520. The number of times the audio file is played back can be used to dynamically determine a playlist. In some embodiments, an audio file is determined to be played back in its entirety if the file is played up until a point near the end of the audio file, such as for example within five seconds of the end of the audio file, or some other time period. If a determination is made at step 520 that the audio file is not played back in its entirety, the method of FIG. 5 continues to step 540. If the audio file is played back in its entirety, a play count for the audio file is implemented at step 530 and the incremented play count is stored. The play count for an audio file is stored in media player database 150, such as for example in the audio data table illustrated in FIG. 3. In some embodiments, each user on a machine has their own media player database. After incrementing and saving the play count at step 530, the method of FIG. 5 continues to step 540.

A determination is made as to whether an audio file is rated by a user at step 540. A user may rate an audio file during playback, when browsing an audio file list through an interface, or in some other manner. In some embodiments, the user may rate an audio file somewhere between a maximum or high level and a minimum or low level, such as for example from high rating of 5 to low rating of 1. If an audio file is not rated by a user at step 540, the method of FIG. 5 ends at step 570. If the audio file is rated by the user, the user rating for the audio file is stored in media player database 150 at step 550. The user rating is then stored in the audio file itself, if possible, at step 560. In some embodiments, the user rating may be stored within the audio file if the audio file or file format permits it. In some embodiments, content added to the media player library that exists over a network is listed on client 110, not on the over the network. In this embodiment, the rating is stored over the network (for example, application server 230) in the file itself, not in a media player database located over the network. After storing the user rating in a media player database, the method of FIG. 5 is complete at step 570.

Figure 6:
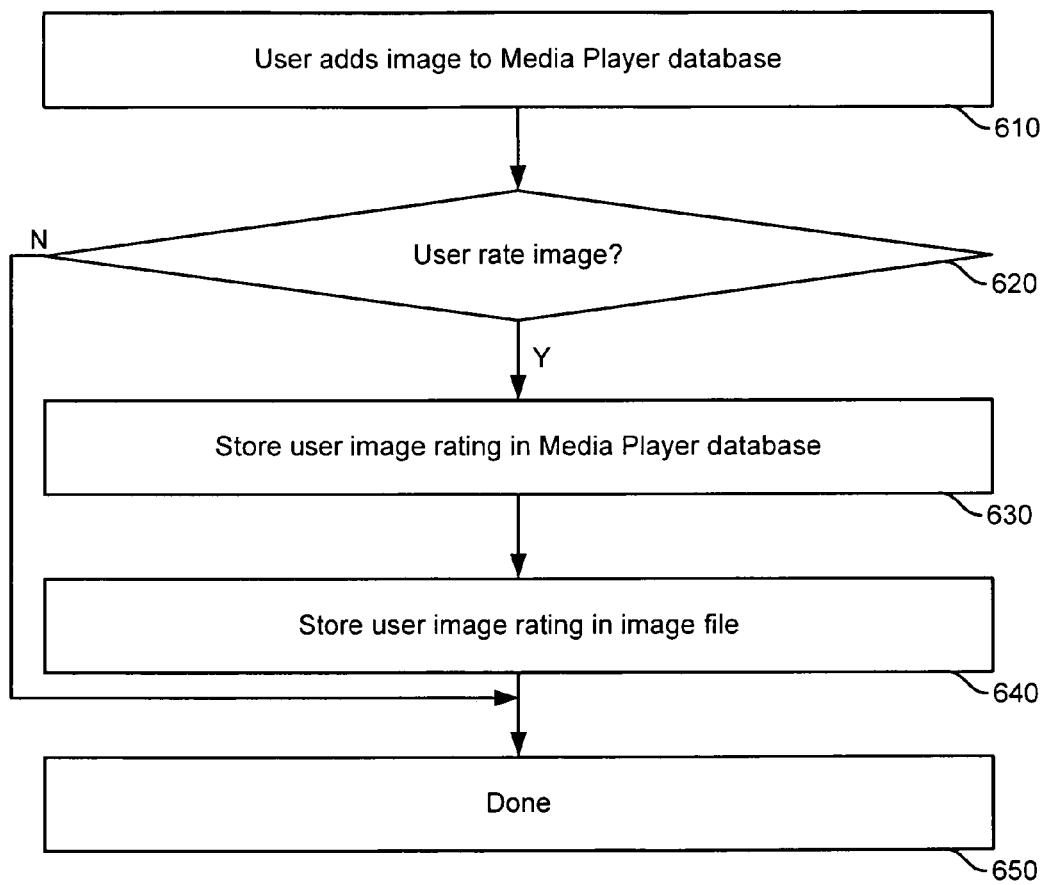
FIG. 6 illustrates a flowchart of an embodiment of a method for creating dynamic playlist data for image files.

FIG. 6 illustrates a flowchart of an embodiment of a method for creating data used to evaluate dynamic playlist criteria image files. The method of FIG. 6 can be performed by media player 140, media center 130 or both, and the steps of the method can be performed in any order and at any time. First, a user may add an image to a media player database at step 610. An image may be added to a media player when a user views the image through the media player, adds an image to a folder recognized by the media player, or in some other manner. Next, a determination is made as to whether the user has rated an image at step 620. The user may rate an image while viewing an image through media player 130 or some other application. The user rating may set a level between a maximum or high level or a low or minimum level, such as for example a high rating of 5 or a low rating of 1. If the user has not rated an image at step 620, the method of FIG. 6 ends at step 650. If the user has rated an image, the image rating is stored in a media player database at step 630. The image rating is then stored in the image file, if possible, at step 640. After storing the image rating for the user in a database, the method of FIG. 6 ends at step 650.

Figure 7:
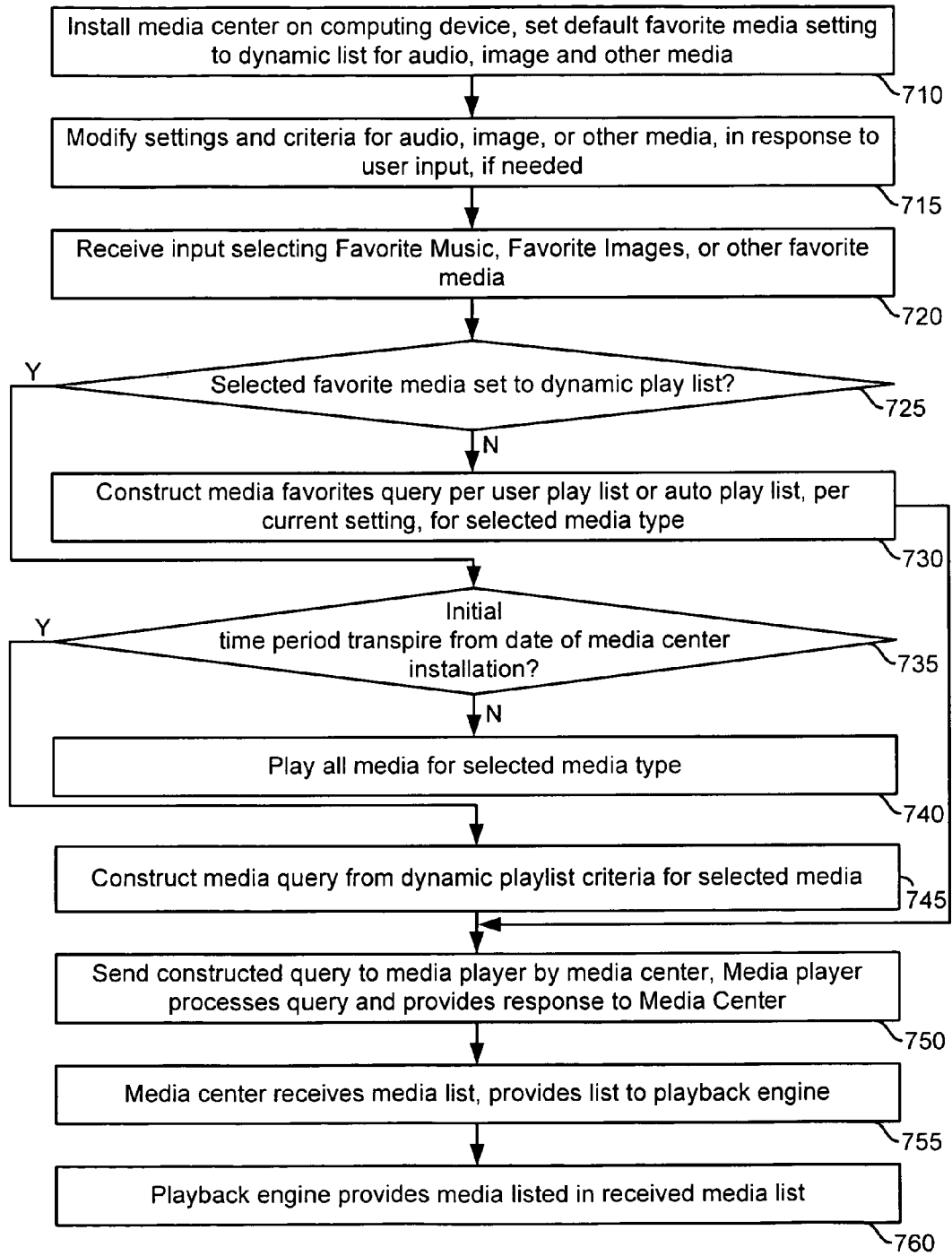
FIG. 7 illustrates a flowchart of an embodiment of a method for dynamically providing media to a user.

FIG. 7 illustrates a flowchart of an embodiment of a method for providing media in a dynamic playlist to a user. First, media center 130 is installed on computing device 110 and a default favorite media setting is set to a dynamic play list at step 710. In some embodiments, a "favorite music" collection will include a user's entire music library for the first thirty days. This is because by default, "music added in the last 30 days" is checked. The system may still be running a query, it just will return everything for the first thirty days. In some embodiments, a request for a user's favorite media will not be processed using a dynamically generated play list for the first thirty days after installation of media center 130. This enables media center 130 to collect data regarding the user's preferences for media, such as user viewing, rating or playback habits as discussed above with respect to the method of FIG. 5.

Next, favorite media settings and dynamic playlist criteria may be modified for audio, image, or other media, in response to user input, if needed at step 715. In some embodiments, a user may adjust a setting that indicates how a "Favorite" media is determined. Thus, step 715 may occur at any point during the method of FIG. 7. For example, a user may set a "Favorite Music" setting to a dynamic playlist, user playlist or automatic playlist. The criteria for a dynamic playlist can also be modified by a user at any time. Modifying settings and criteria for media lists in response to user input is discussed in more detail below with respect to FIG. 8A for audio media and FIG. 9A for image media.

Input is received selecting favorite music, favorite images or other favorite media at step 720. In some embodiments, the selection of a "favorite music" tab or "favorite images" tab or button may be received by media center 130 or an operating system, such as through a start-up menu interface provided by operating system 120. In response to receiving an input for a favorite media, a determination is made as to whether a favorite media setting has been set to a dynamic playlist at step 725. Several types of playlists, including a dynamic play list, user-created play list and auto playlist, may be used to determine and provide media to a user. The determination made at step 725 is whether a dynamic playlist is set to determine the favorite media. If a dynamic playlist is set to be used to determine the selected favorite media, the method of FIG. 7 continues to step 735. If the dynamic playlist is not associated with the selected favorite media, then a media favorites query is generated for either a user playlist, auto playlist, or other playlist, according to the current setting for the media type selected at step 730. Constructing a query for media favorites based on a user-created playlist or an auto playlist is discussed in more detail below with respect to FIG. 10. After generating the query, the method of FIG. 7 continues from step 730 to step 750.

A determination is made as to whether an initial time period has transpired from the date the media center application 130 was installed on computing device 110 at step 735. In some embodiments, before determining a dynamic playlist the present system may allow users to rate media and perform other activity which may be monitored (as described with respect to the method of FIG. 5). User playback and rating activity is performed for an initial period of time to generate data from which the dynamic playlist may be generated. The time period may be any period designated by a user or the application itself, such as for example thirty days, forty-five days, a period of time required to view a minimum number of audio files or user ratings, or some other time period. If the initial time period has transpired, the method of FIG. 7 continues to step 745. If the initial time period has not transpired, then all media is provided for the requested type at step 740 and the method of FIG. 7 ends. In some embodiments, this feature is implemented as a result of a default query. The present system won't specifically instruct media center 130 to play all music or all pictures. Rather, for music, the "added in the last 30 days" criteria will return an entire library. Similarly for pictures, the "added in last 3 months" will return an entire library.

A media query is constructed from the dynamic playlist criteria for the selected media at step 745. The query may be based on criteria of user ratings, auto-ratings, when the media was added and/or other criteria for a dynamic playlist. Constructing a query from dynamic playlist criteria for the selected media is discussed in more detail below with respect to FIG. 11 for an audio media query and FIG. 12 for image media queries.

After constructing a media query, the constructed query is sent to media player 140 by media center 130 at step 750. The media player processes the query and provides a response to media center 130 with a media list. Receiving and processing a query by media player 140 is discussed in more detail below with respect to FIG. 13. Media center 130 receives the media list in response to the query and provides the list to playback engine 132 within media center 130 at step 755. Playback engine 132 then retrieves and provides the media listed in the list to a user at step 760. Providing the media may include playing back music listed in a music list or displaying images in an image list. In some embodiments, a subset of the music, images, video or other content in the list can be played or otherwise provided before all the media in the list has been returned by the database. This may enhance performance of the system. Thus, if the list of requested media or library being querying is quite large, it may take some time to return a list of content. This feature would allow a user to begin providing media before all the listed media had been returned. It would then continue adding content in the background.

Figure 8A:
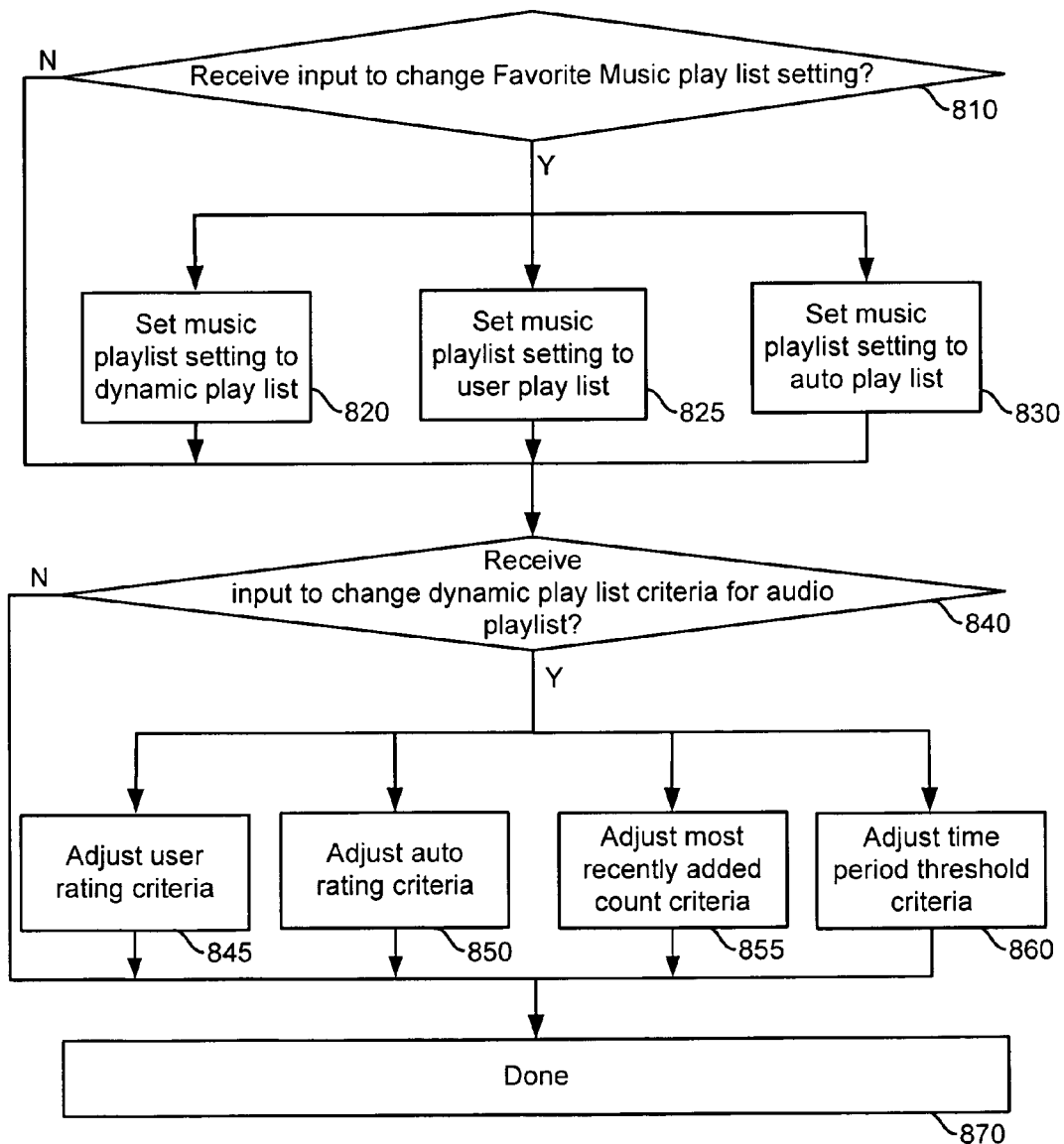
FIG. 8A illustrates a flowchart of an embodiment of a method for modifying settings and criteria for providing audio files to a user.

FIG. 8A illustrates a flowchart of an embodiment of a method for modifying audio file playlist settings and dynamic playlist criteria. In some embodiments, the method of FIG. 8A provides more detail for step 715 of the method of FIG. 7.

Steps 810-830 relate to modifying playlist settings. First, a determination is made as to whether input is received to change a playlist setting at step 810. A user may set the type of playlist from which their favorite music is determined. The input may be received in an interface, such as for example the interface of FIG. 8B, which is discussed in more detail below. If no input is received to change the favorite music playlist setting at step 810, the method of FIG. 8A continues to step 840. If input is received to change the setting, the setting is changed according to any one of steps 820-830. The "Favorite Music" playlist setting may be set to a dynamic playlist at step 820. The dynamic playlist may be used to dynamically determine a list of favorite music. The music setting may be set to a user-created playlist at step 825. If a user creates a static list of audio files, the user playlist may be designated as the playlist associated with the "favorite music" feature. The "favorite music" playlist setting may also be set to an auto playlist. An auto playlist has one or more parameters based on content, such as for example, all audio files by the artist "Foo Fighters" or all audio files in the genre of "Disco". After each of steps 820-830, the method continues to step 840.

Steps 840-860 relate to modifying dynamic playlist criteria. A determination is made as to whether input is received to change dynamic playlist criteria at step 840. In some embodiments, a user may change dynamic playlist criteria used to dynamically generate a favorite list of audio files. An example of a user interface for changing criteria is illustrated in FIG. 8C. If no input is received to change dynamic playlist criteria, the method of FIG. 8A is complete at step 870. If input is received to change dynamic playlist criteria, then the criteria is adjusted at any one or more of steps 845-860.

A user rating criteria is adjusted at step 845. As discussed above, user rating criteria may be set between a high level and low level implemented by a rating system provided by media center 130. A user rating may be set between a high rating of 5 and a low rating of 1. The criteria may set a minimum rating level at which the audio file must have to be included in the favorite playlist, for example all audio files with a user rating of four or higher. Alternatively, a user may modify the setting such that it is not considered, so that the user rating overrides an automatic rating, or some other modification.

An auto-rating criterion may be adjusted at step 850. The auto-rating may be generated in several ways, such as for example based on the average number of times an audio file in the user's media player database 150 is played. In particular, the process may determine the average number of times an audio file in the database is played, as well as the standard deviations between the different play counts. Next, a range is identified based on the standard deviation and is associated with each level in the auto-rating. Each audio file is assigned an auto-rating based on where its play count falls within the ranges created. For example, the songs in a user's database may have been played an average of 20 times, with a standard deviation of 3. Therefore, an auto file which was played back a number of times within the range of 19-22 may have a rating of 3, playback within the range of 23-25 times may have a rating of 4, and an audio file played over 25 times may have a rating of 5. The method discussed is a simplified method for automatically determining a rating for an audio file, and other methods are possible and considered within the scope of the present technology for determining an auto-rating.

The most recently added count criteria may also be adjusted at step 855. The most recently added count criteria may set a number for the most recently added songs to include in favorite audio files. For example, setting a most recently added count to fifty results in including the last fifty audio files added the media player database to the favorite music list. The time period threshold criteria may be adjusted at step 860. The time period threshold criteria indicates a period of time over which all audio files added are included in the favorites music list, such as for example all audio files added in the last "30 days."

Figure 8B:
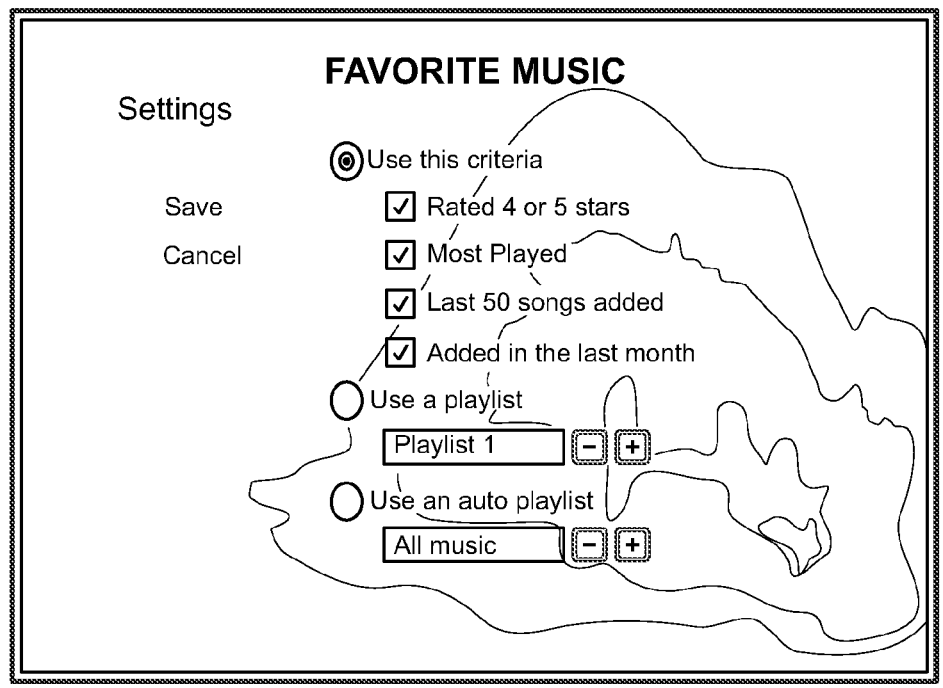
FIG. 8B is an example of an interface for changing a favorite music playlist setting.
Figure 8C:
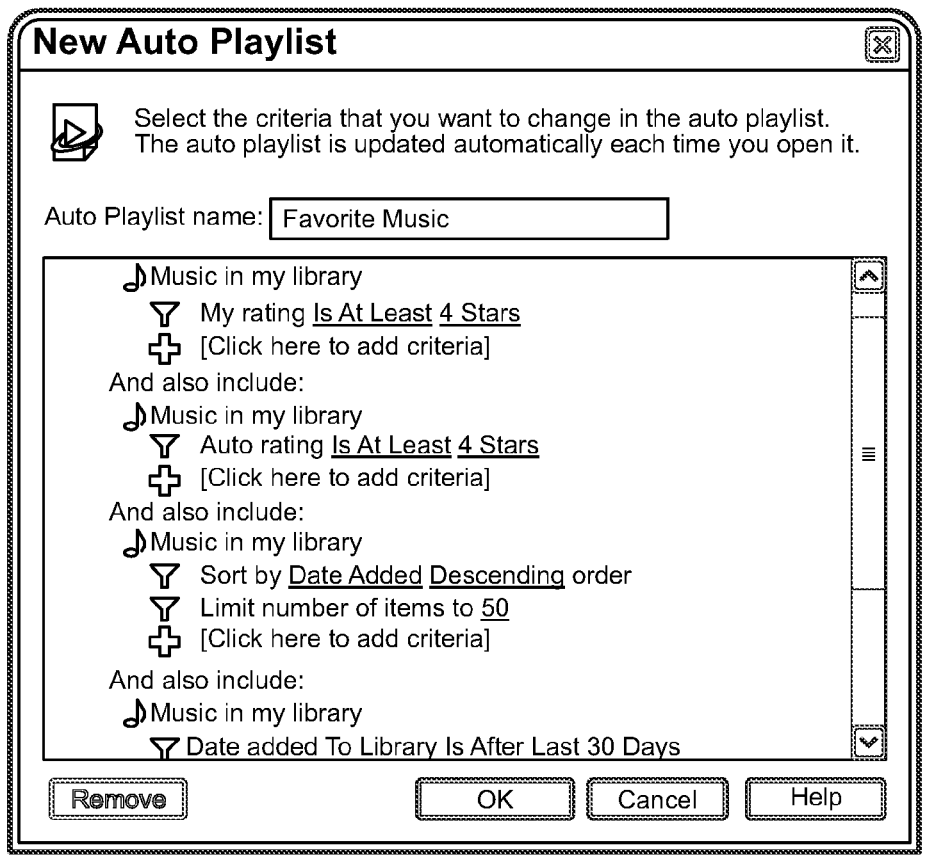
FIG. 8C is an example of an interface for changing dynamic playlist criteria.

FIG. 8B is an example of an interface for changing a favorite music playlist setting. Three playlist settings are illustrated in the interface, including a dynamic playlist (which is currently checked), a user playlist and an automatic playlist. A user may modify the playlist setting, as discussed above with respect to steps 810-830, by selecting one of the playlist types. The interface of FIG. 8B may be provided by media center 130 or 136.

FIG. 8C is an example of an interface for changing dynamic playlist criteria for a favorite music playlist. The criteria listed in the interface for FIG. 8C includes user rating, auto-rating, most recently added, and time period threshold. In particular, the user rating criteria is "at least 4 stars", the auto-rating criteria is "at least 4 stars", the most recently added criteria is "50", and the time period threshold is "last 30 days." The interface of FIG. 8C may be provided by media center 130 or 136.

Figure 9A:
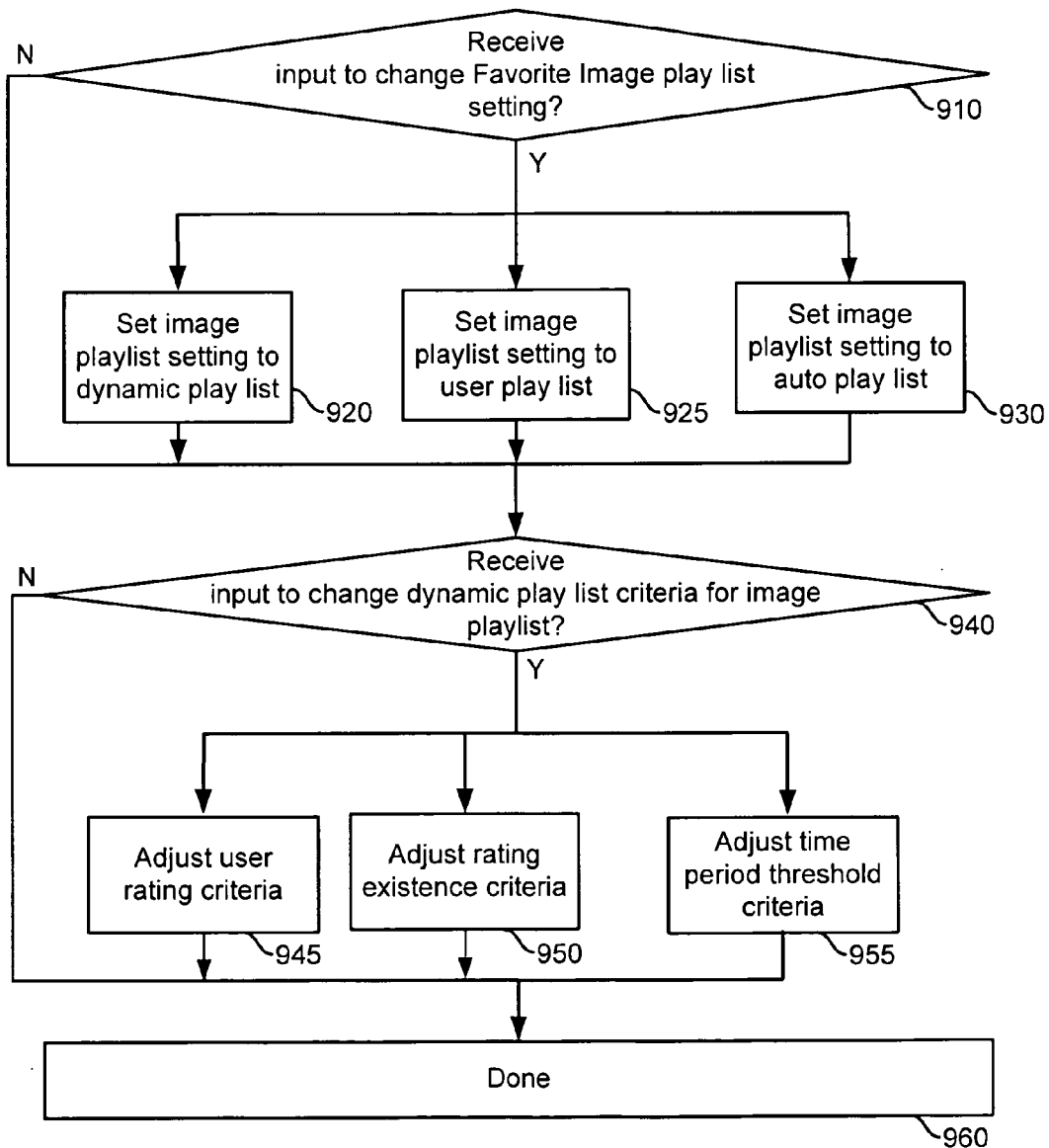
FIG. 9A illustrates a flowchart of an embodiment of a method for modifying settings and criteria for providing image files to a user.

FIG. 9A illustrates a flowchart of an embodiment of a method for modifying image media playlist settings and dynamic playlist criteria. In some embodiments, the method of FIG. 9A provides more detail for step 715 of the method of FIG. 7. First, a determination is made as to whether input to change a favorite image playlist setting is received at step 910.

In some embodiments, a user may set the type of playlist from which favorite pictures are determined. If input is not received to change the Favorite image playlist setting, the method of FIG. 9A continues to step 940. If input is received to change the favorite image playlist setting, the image playlist setting may be changed at any of steps 920-930.

An image playlist setting may be set to a dynamic playlist at step 920. A dynamic playlist may dynamically determine favorite images at the time that user input is received to provide the user's favorite images. Alternatively, an image playlist setting may be set to a user playlist at step 925. A user playlist may be a list of images created by a user, such as a particular album or a collection of pictures comprising a slideshow. The image playlist setting may be set to an automatic playlist at step 930. An automatic playlist may designate all images, a particular album or folder, or some other content parameter to specify a list of images to associate as the favorite pictures. After setting an image playlist setting at steps 920-930, the method of FIG. 9A continues to step 940.

Steps 940-955 relate to modifying dynamic playlist criteria for image media. A determination is made as to whether input is received to change dynamic playlist criteria at step 940. If no input is received to change dynamic playlist criteria for image media, the method of FIG. 9A ends at step 960. If input is received to change the image criteria, the criteria may be changed at steps 945-955.

A user rating criteria is adjusted at step 945. Similar to that discussed above regarding audio files, a user can rate pictures from high to low, for example from a high rating of 5 to a low rating of 1. The user rating criteria may set a minimum or maximum rating level required to include an image in the favorite pictures playlist, such as for example all images with a user rating of four or higher. A rating existence criterion may be adjusted at step 950. A rating existence criterion may indicate whether or not unrated pictures should be included in the user's favorite pictures playlist. For example, the criteria may require that unrated pictures are included in a dynamic playlist associated with a user's "Favorite Pictures." A time period threshold criteria may be adjusted at step 955. A time period threshold criteria indicates whether or not pictures added within a period of time should be included within the user's favorite pictures and/or how long that time period should be. After adjusting dynamic playlist criteria at steps 945-955, the method of FIG. 9A is complete at step 960.

Figure 9B:
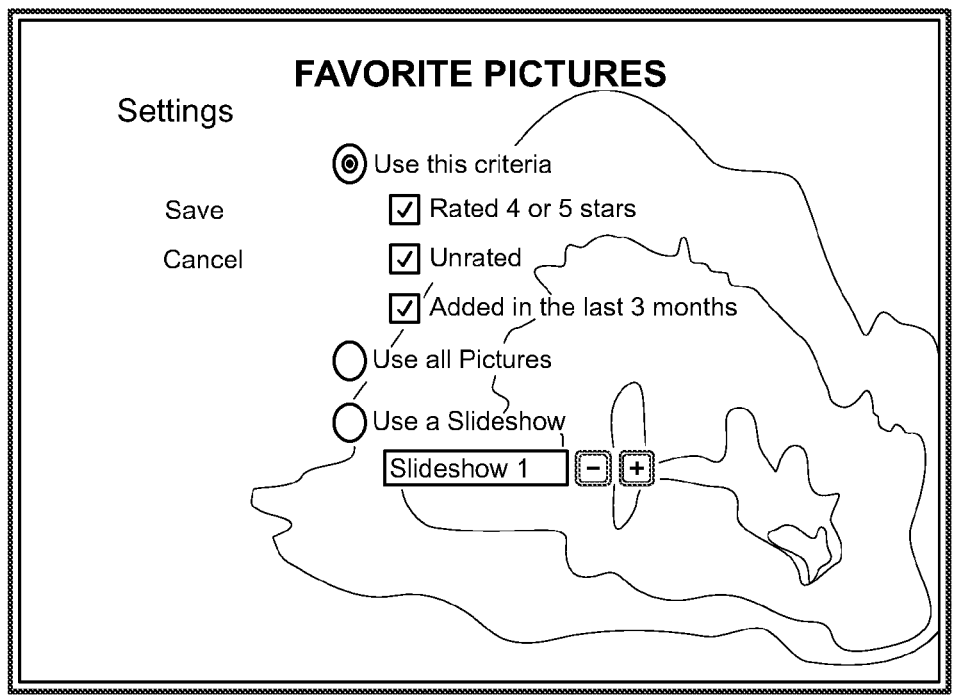
FIG. 9B is an example of an interface for changing a favorite image playlist setting.

FIG. 9B illustrates an example of an interface for changing a favorite image, Favorite Pictures, playlist setting. As indicated in the interface, favorite pictures may be set as a dynamic playlist (selected), all pictures, or a user generated slideshow. The interface of FIG. 9B may be provided by media center 130 or 136.

Figure 9C:
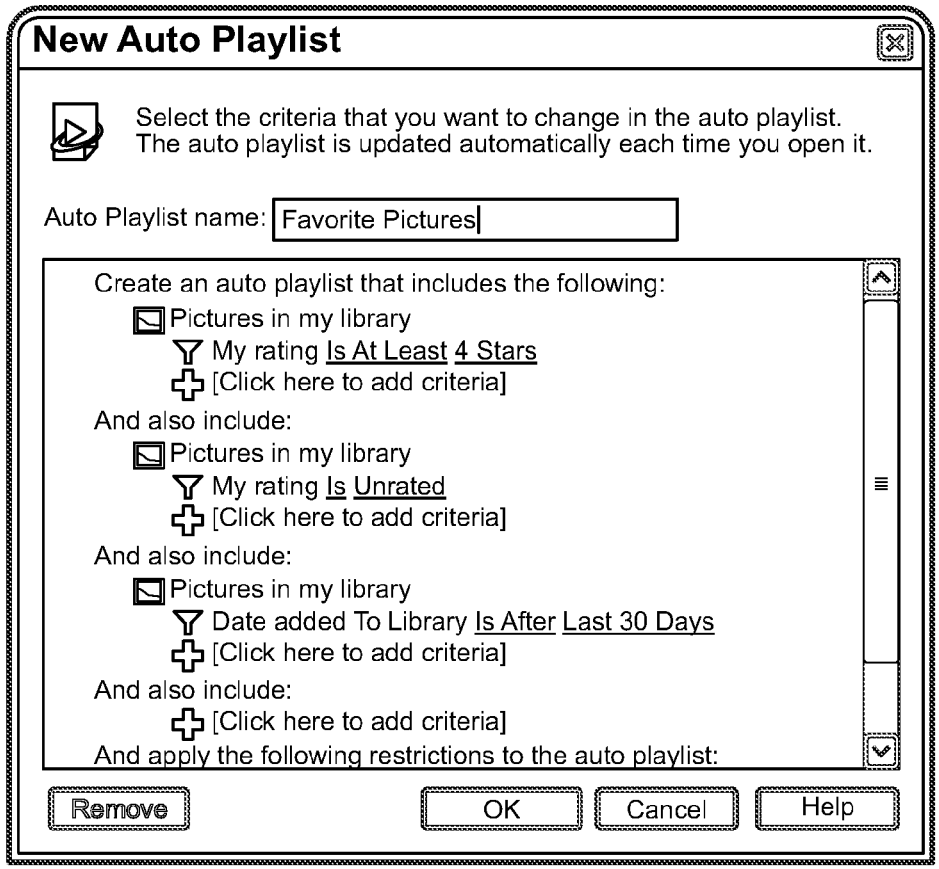
FIG. 9C is an example of an interface for changing dynamic playlist criteria.

FIG. 9C illustrates an example of an interface for changing dynamic playlist criteria for "Favorite Pictures." The interface of FIG. 9C indicates criteria of user rating, whether or not a picture is unrated, or a time period threshold criteria may be used to select a user's favorite pictures. In particular, the user rating criteria is "at least four stars", pictures that are "unrated" are included in the favorite pictures list, and the time period threshold indicates that pictures are included if they are added to the user's library "within the last 30 days." The interface of FIG. 9C may be provided by media center 130 or 136.

Figure 10:
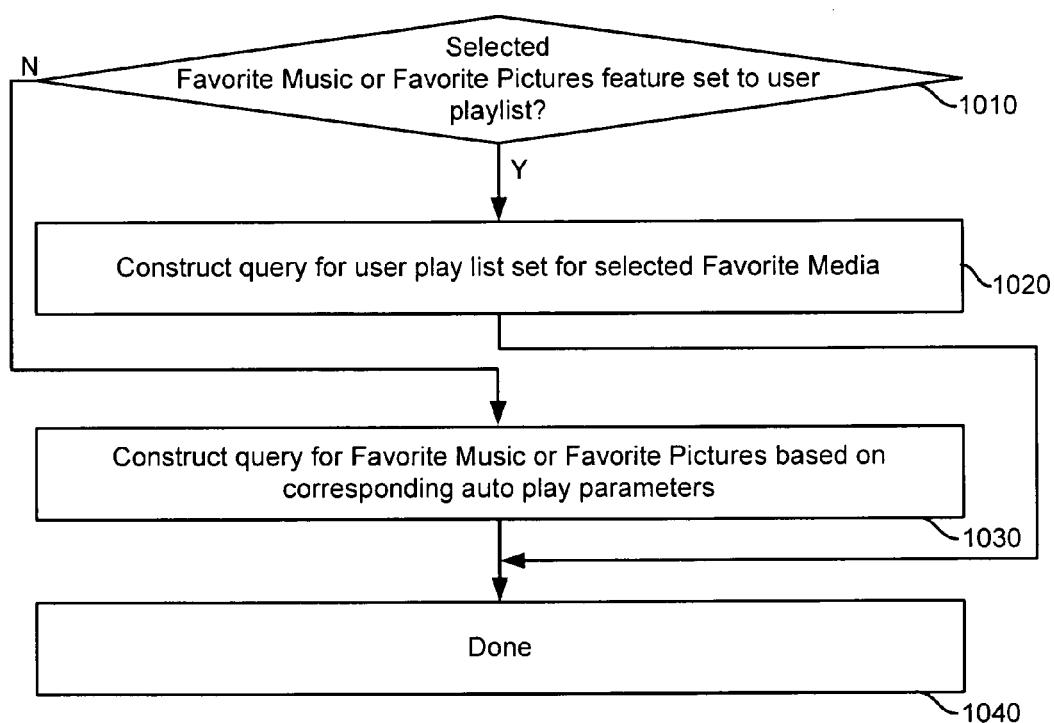
FIG. 10 illustrates a flowchart of an embodiment of a method for constructing a query for media files.

FIG. 10 illustrates a flowchart of an embodiment of a method for constructing a query for a list of media files. In some embodiments, the method of FIG. 10 provides more detail for step 730 of the method of FIG. 7. The method of FIG. 10 generates a query for list of media based on pre-created user lists or auto playlists; not based on a dynamic media playlist. First, a determination is made as to whether the selected favorite music setting or favorite pictures setting is set to a user playlist at step 1010. If the selected favorite media playlist setting is set to a user playlist, a query is constructed for a favorite media playlist based on the user created playlist at step 1020. The method of FIG. 10 then ends at step 1040. If the selected media playlist setting is not set to a user playlist, then the query is constructed based on auto play parameters set by a user at step 1030. A query based on an auto playlist may include content parameters such as for example a particular artist, music genre, album, or other content parameter. The content parameter may be selected by a user, for example in an interface such as that in FIG. 8B or 9B. After constructing a query based on corresponding auto play parameters, the method of FIG. 10 is complete at step 1040.

Figure 11:
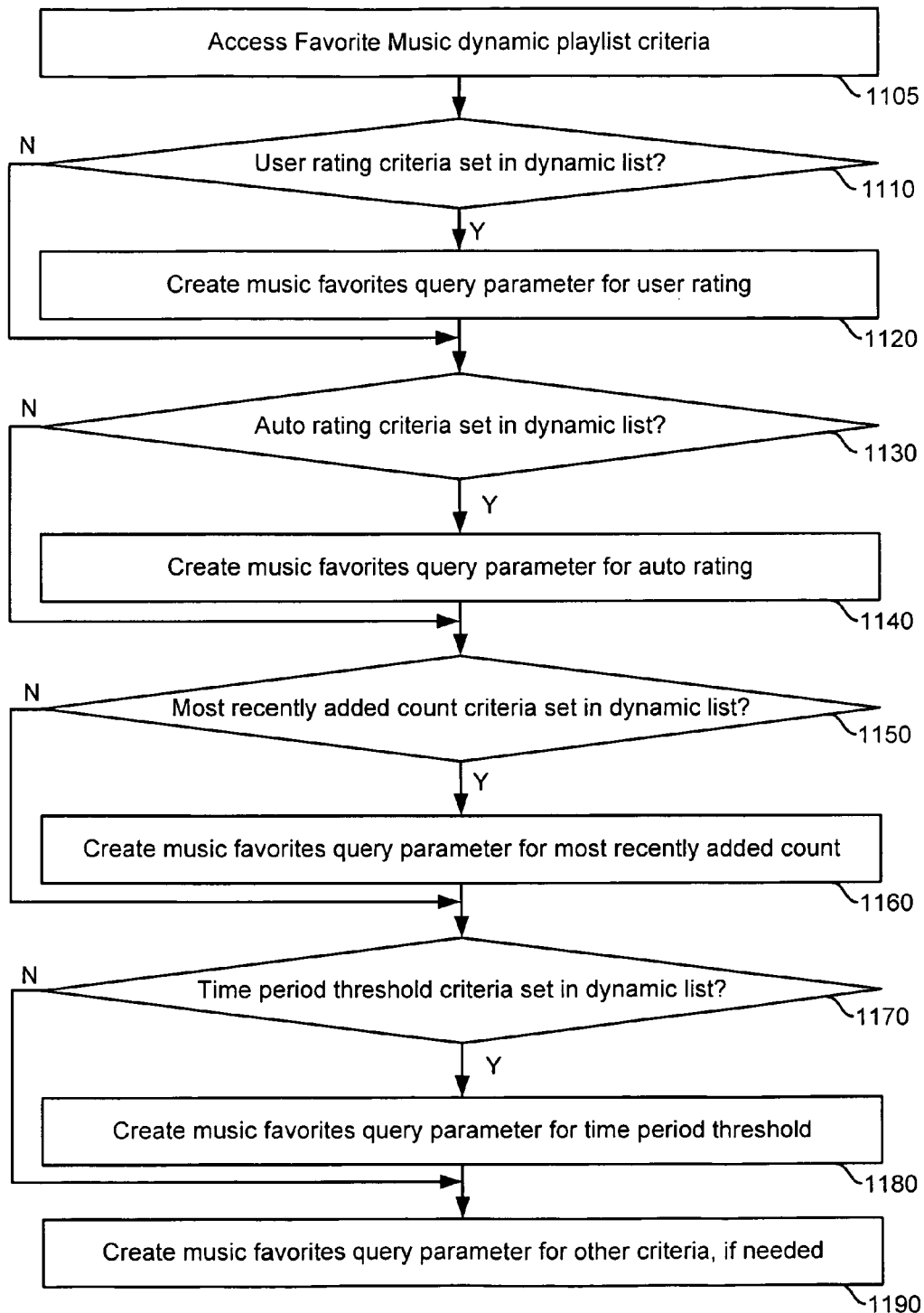
FIG. 11 illustrates a flowchart of an embodiment of a method for generating a query for dynamic playlist audio files.

FIG. 11 illustrates a flowchart of an embodiment of a method for generating a query from dynamic playlist criteria for audio media. A query comprised of query parameters is generated from dynamic play list criteria, and the resulting query is eventually transmitted to media player database 150 In some embodiments, the method of FIG. 11 provides more detail for step 745 with respect to audio such as music.

The "favorite music" dynamic playlist criteria are accessed at step 1105. The criteria may be accessed by query generator 134 or some other element of media center 130. A determination is then made as to whether the user rating criteria is set in the dynamic list at step 1110. If a user rating criteria is set in the dynamic playlist, a query parameter is generated for the music rating at step 1120 and the method of FIG. 11 continues to step 1130. For example, with respect to the interface of FIG. 8C, the dynamic playlist user rating criteria is set to include audio files that have a user rating of 4 or higher. If the user rating criteria is not set in the dynamic playlist, then user rating will not be a part of the query from which the list of favorite music is determined and the method of FIG. 11 continues to step 1130.

A determination is made as to whether an auto-rating criterion is set in the accessed dynamic playlist at step 1130. If the auto-rating criteria is set in the dynamic list, then a music favorites query parameter is generated for the auto-rating at step 1140. In the interface of FIG. 8C, the auto rating criteria is set to include audio files that have an auto-rating of "at least 4 stars." The method of FIG. 11 then continues to step 1150. If the dynamic playlist for favorite music does not include an auto-rating criteria, or the auto rating criteria is overridden by the user rating as requested by a user, then the method of FIG. 11 continues to step 1150.

A determination is made as to whether the most recently added count criteria is set in the dynamic playlist at step 1150. If the most recently added count criteria is not set, the method of FIG. 11 continues to step 1170. If the most recently added count criteria is set in the dynamic playlist, a music favorites query parameter is created for the most recently added count at step 1160 and the method of FIG. 11 continues to step 1170.

A determination is then made as to whether a time period threshold criteria is set in the dynamic playlist at step 1170. If a time period threshold criteria is not set, then any other music favorites query parameters may be set at step 1190 and/or the method of FIG. 11 ends at step 1190. If a time period threshold criteria is set at step 1170, a music favorites query parameter is created for the time period threshold at step 1180 and the method of FIG. 11 ends at step 11190.

In some embodiments, different operational functions, rules and other features can be used to combine query parameters derived from dynamic playlist criteria or otherwise configure a playlist. For example, any combination of "OR" or "AND" operations may be used between the different query parameters to construct the query. Furthermore, a dynamic playlist criteria may be configured such that inclusion of one criteria is dependent on the existence of another. For example, a dynamic playlist may be configured such that auto-rating criteria for an audio file is only used to add audio files to a play list if a user has not rated that particular file, effectively allowing a user rating to override any auto rating. Put another way, an auto rating can be assigned the same value as a user rating for a media file, once the user rating is created. In some embodiments, this prevents a song rated low by a user from being included in a playlist because of a high automatic rating for the file. Additionally, playlist configuration can be configured such that each media file is included only once in the list. In some embodiments, however, duplicate, triplicate or some other number of the same file can be included in the same dynamically created playlist.

Figure 12:
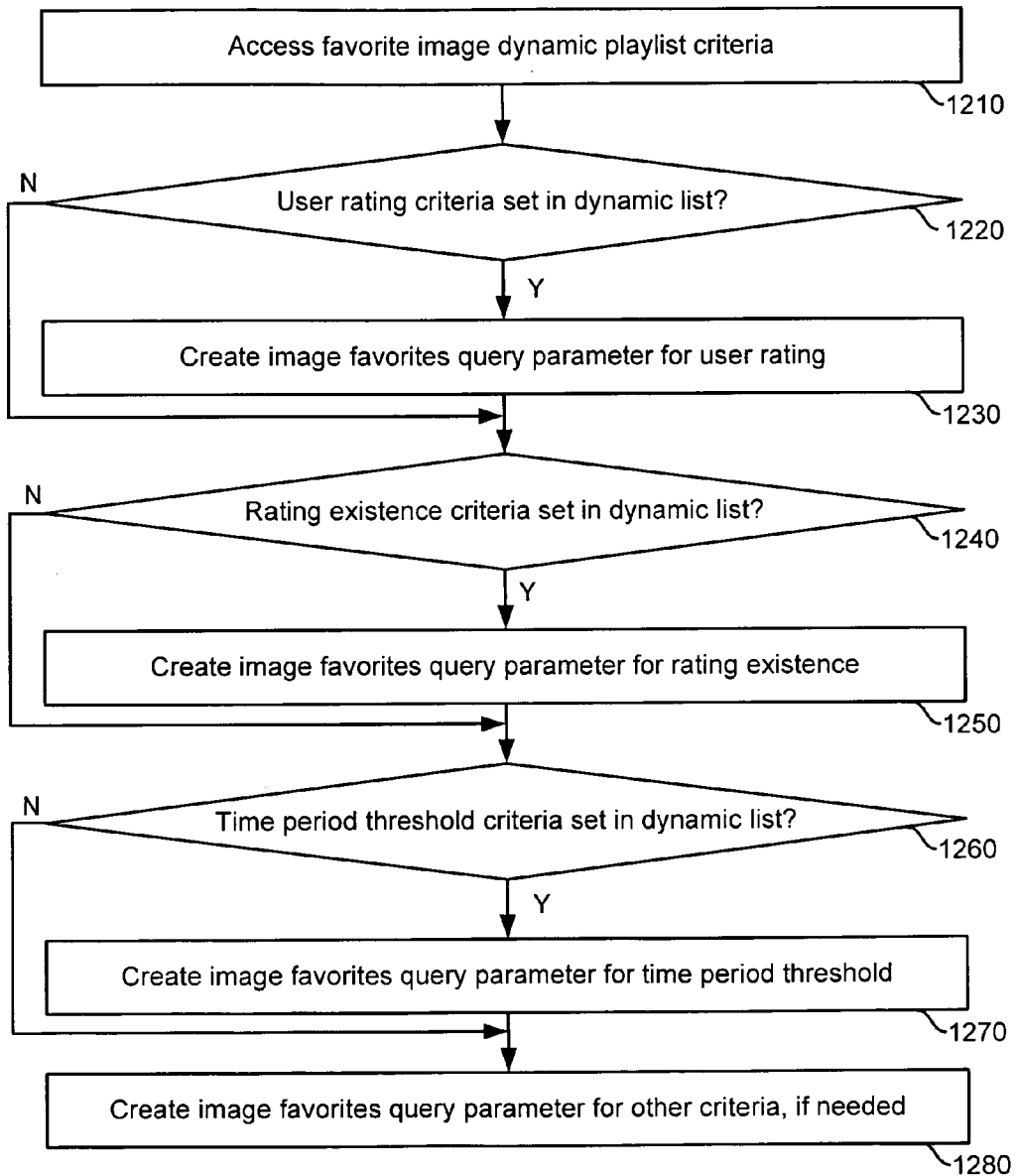
FIG. 12 illustrates a flowchart of an embodiment of a method for generating a query for dynamic playlist image files.

FIG. 12 illustrates a flow chart of an embodiment of a method for generating a query from dynamic playlist criteria for image files. In some embodiments, the method of FIG. 12 provides more detail for step 745 of the method of FIG. 7 with respect to image media. As with audio files discussed above with respect to FIG. 11, a query comprised of query parameters is generated from dynamic play list criteria. The resulting query is eventually transmitted to media player database 150. Application of the query against media data in the database is discussed in more detail below with respect to FIGS. 14 and 15.

First, dynamic playlist criteria for a "Favorite Image" are accessed at step 1210. Next, a determination is made as to whether user rating criteria has been set in the dynamic playlist for favorite images at step 1220. If a user rating criteria is not set, the method of FIG. 12 continues to step 1240. If the user rating criteria is set in the dynamic playlist, a query parameter is created for the user rating at step 1230 and the method of FIG. 12 continues to step 1240.

A determination is then made as to whether a rating existence criteria is set in the dynamic playlist at step 1240. The rating existence criteria indicates whether or not an image not rated by a user should be included in a playlist. If the rating existence criteria is not set, the method of FIG. 12 continues to step 1260. If the rating existence criteria is set, an image favorites query parameter is created for the rating existence criteria at step 1250 and the method of FIG. 12 continues to step 1260.

Next, a determination is made as to whether a time period threshold criteria is set in the dynamic playlist at step 1260. If the time period threshold criteria is set, an image favorites query parameter is created for the time period threshold at step 1270 and any other query parameters for image favorite criteria are created at step 1280. If no other image favorite query parameters are needed, the method of FIG. 12 ends at step 1280. If the time period threshold criteria is not set in the dynamic list at step 1260, then the method of FIG. 12 continues to step 1280.

Figure 13:
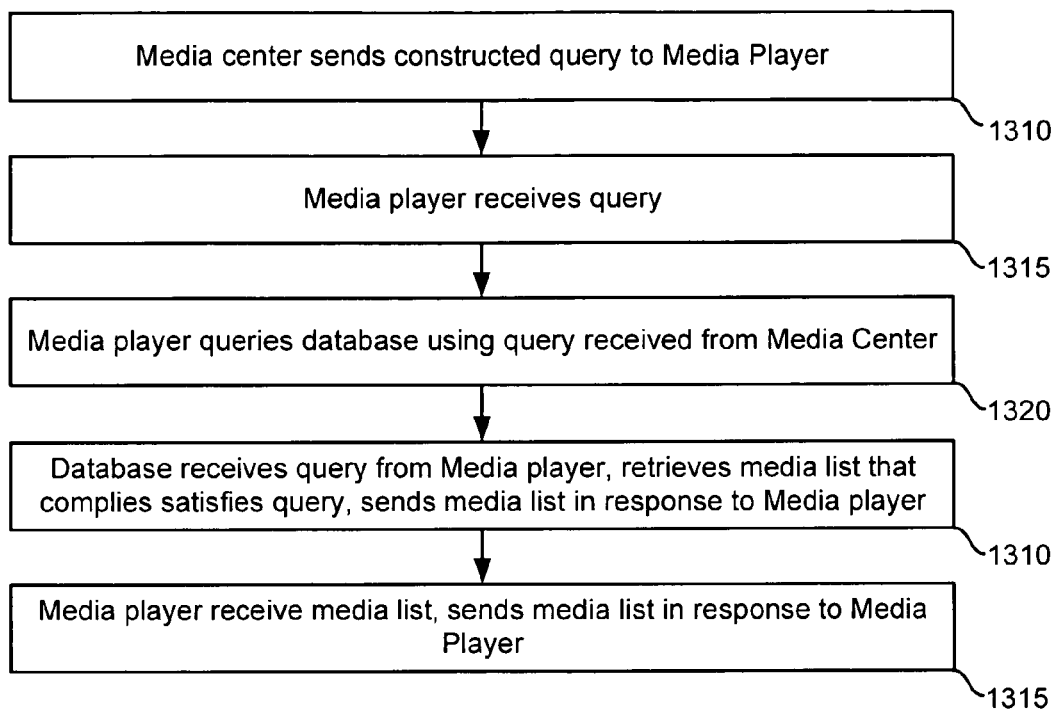
FIG. 13 illustrates a flowchart of an embodiment of a method for querying a database for media files.

FIG. 13 illustrates a flow chart of an embodiment of a method for querying a database for a list of favorite media. In some embodiments, the method of FIG. 13 provides more detail for step 750 of the method of FIG. 7. First, media center 130 sends a constructed query to media player 140 at step 1310. Media player 140 receives the query at step 1315 and queries media player database 150 based on the received query at step 1320. Media player database 150 receives the query from media player 140, retrieves a media list that satisfies the query, and sends the media list to media player 140 in response to the request received by media player 140 at step 1310. Processing the query by a media center database is discussed in more detail with respect to FIG. 14. Next, media player 140 receives the media list and sends the received media list to media center 130 in response to the query received from media center 130 at step 1315.

Figure 14:
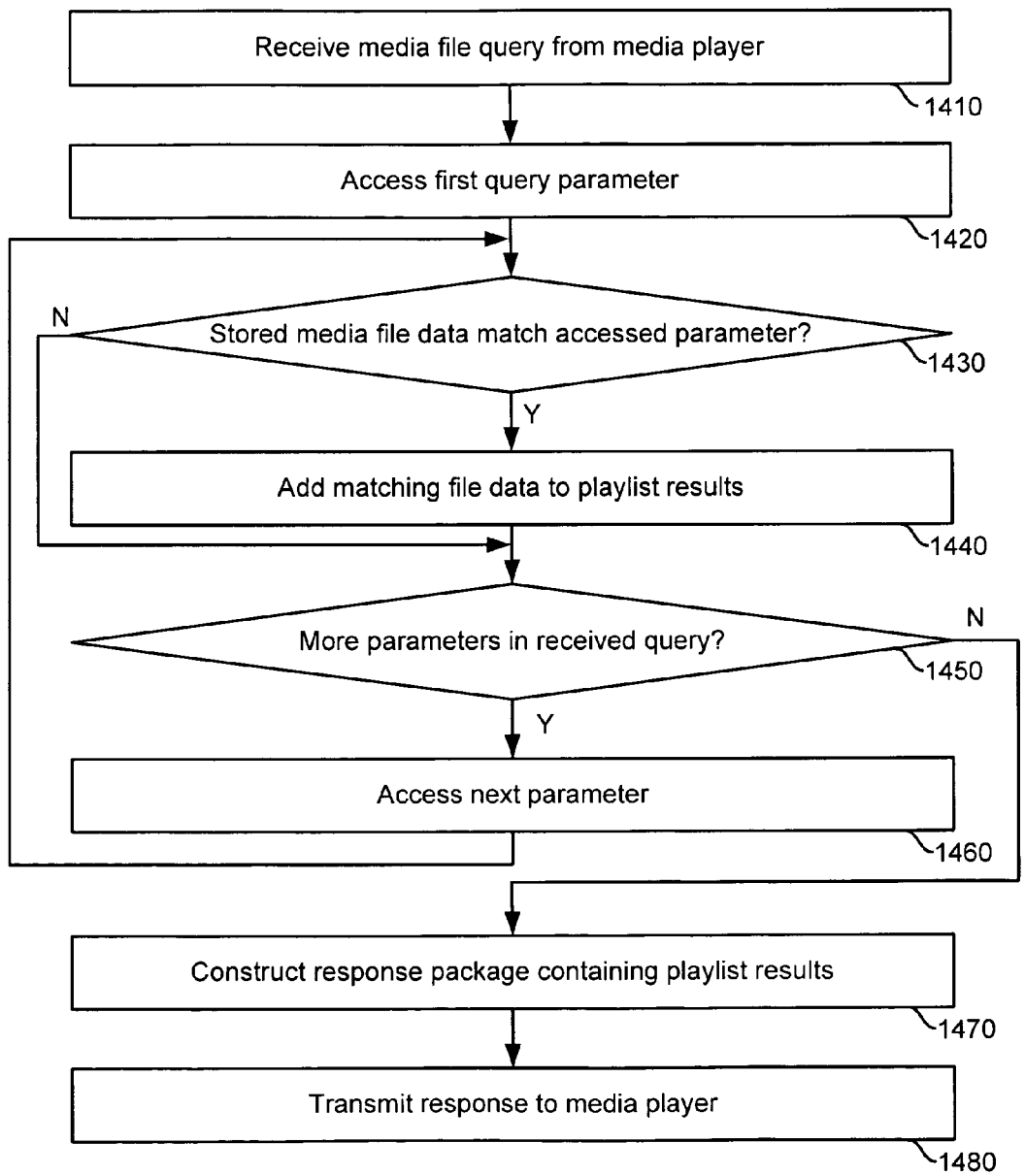
FIG. 14 illustrates a flowchart of an embodiment of a method for applying a query to media data in a database.

FIG. 14 illustrates a flowchart of an embodiment of a method for applying a query to media data in a database. In some embodiment, the method of FIG. 14 is performed by a media file database and provides more detail for step 1310 of the method of FIG. 13. First, a media file query is received from media player 140 at step 1510. The first query parameter is accessed at step 1520. A determination is then made as to whether media file data stored within the media file database matches the accessed query parameter at step 1530. If data in the database matches the accessed query parameter, the matching file data as added to playlist results at step 1530. If data in the database does not match the accessed query parameter, the method continues to step 1550.

For purposes of example, a query based on dynamic playlist criteria for a user's "Favorite Pictures" in the interface of FIG. 9B will be applied to the image media data in the table of FIG. 4. The query parameter abased on a user rating criteria adds image files to the playlist if they have a rating of at least four stars. With reference to the data in the audio data in the table of FIG. 3, the first and fourth records in the table would satisfy a query parameter based on this criteria; in particular, data records associated with a rating of 4 and 5. Therefore, the record for the image file having a filename of "yosemitepark01" and a user rating of 4 and the image file having a filename of "AmandaBirthday" and a user rating of 5 would be added to the playlist at step 1540 based on the user rating criteria indicated in FIG. 9C.

The next criteria indicates that pictures without a user rating should also be added to the playlist. A query parameter based on this criteria would add the last record, titled "familyBBQ", to the playlist (rating of "null" indicating no user rating). The last dynamic playlist criteria indicated in FIG. 9C indicates that image files added within the last 30 days should be added to the play list. If the dynamic playlist query is made on Apr. 3, 2008 or later, a corresponding query parameter is made over thirty days after the last audio file was added; no audio files would be included in the playlist based on this criteria. If the dynamic playlist query is made on Apr. 16, 2008, the most recently added audio file titled "familyBBQ" would be added to the playlist. In some embodiments, no duplicate image files may be included in the playlist. If this configuration applied to the current exemplary query, then the audio file titled "familyBBQ" would not be added to the list based on the query parameter for the last criteria because the audio file as already added to the list based on the query parameter for the second criteria associated with unrated image files.

Figure 15:
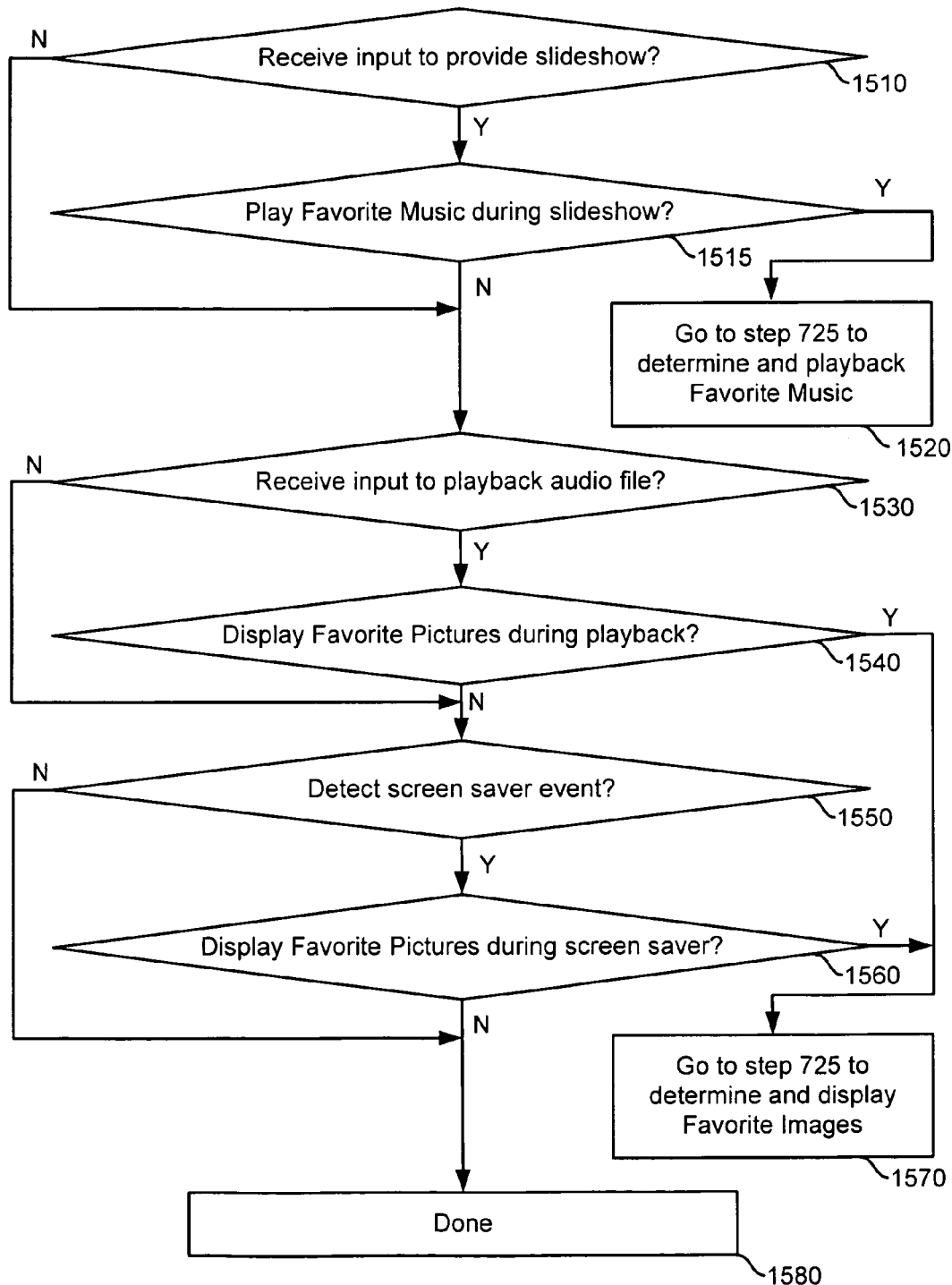
FIG. 15 illustrates a flowchart of an embodiment of a method for providing favorite media to a user.

FIG. 15 illustrates a flowchart of an embodiment of a method for providing favorite media to a user. In some embodiments, favorite music may be provided to a user during a slideshow, other image viewing event, or some other event. Furthermore, a user's favorite pictures may be displayed while playing music, as a screensaver, or based on some other event. The steps of the method of FIG. 15 may be performed at any time.

First, a determination is made as to whether input is received to provide a slideshow at step 1510. If no input has been received to provide a slideshow, the method of FIG. 15 continues to step 1530. If input has been received to provide a slideshow, a determination is made as to whether favorite music should be played during the slideshow at step 1515. In some embodiments, determining whether or not to provide a user's favorite music in the slideshow may be determined by querying a user by the slideshow application just before or during the slideshow is presented to the user. If "favorite music" for a user is not to be provided during the slideshow, the method of FIG. 15 continues to step 1530. If a user's favorite music is to be played during the slideshow, the method continues to step 725 of the method of FIG. 7 to determine and playback the user's favorite music.

A determination is made as to whether input is received to playback an audio file at step 1530. If there is no input to playback an audio file, the method of FIG. 15 continues to step 1550. If input is received to playback an audio file, a determination is made as to whether the user's "favorite pictures" should be displayed during playback of the audio file at step 1540. Determining whether or not to playback the user's favorite pictures may be performed by the particular application playing the audio file, such as media center 130 or media player 140. If a user's favorite pictures should not be displayed during audio file playback, the method of FIG. 15 continues to step 1550. If the user's favorite pictures should be displayed during playback, the method continues to step 725 of FIG. 7 to determine and display the user's "favorite images" at step 1570.

A determination is made as to whether a screensaver event is detected at step 1550. If a screensaver event is not detected, the method of FIG. 15 ends at step 1580. If a screensaver event is detected, a determination is made as to whether the user's favorite pictures should be displayed during the screensaver. In some embodiments, the determination as to whether to display the user's favorite pictures as a screensaver may be determined by checking a user setting for providing a screensaver, a media center 130 setting associated with providing a screensaver, or some other setting associated with the screensaver. If the user's favorite pictures should not be displayed in the screensaver, then the method of FIG. 15 ends at step 1580. If the user's favorite pictures should be displayed as a screensaver, the method of FIG. 14 continues to step 1570.

Figure 16:
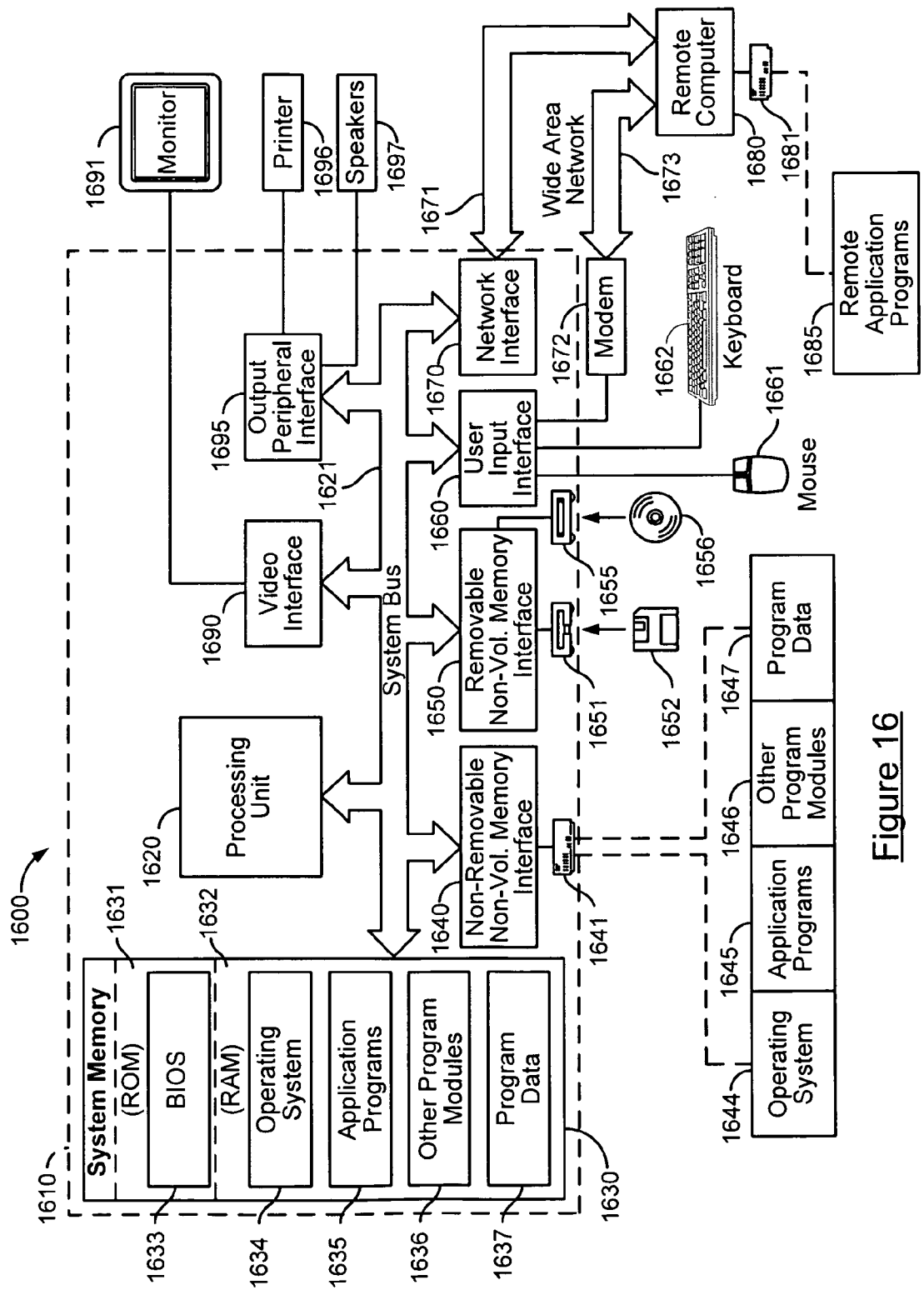
FIG. 16 is a computing environment for use with the present technology.

FIG. 16 illustrates a computing environment for use with the present technology. In some embodiments, the computing environment of FIG. 12 may provide more detail for computing device 110, web server 220, application server 230, and data store 240.

Computing environment 1600 of FIG. 16 is only one example of a suitable computing environment and is not intended to suggest any limitation as to the scope of use or functionality of the technology herein. Neither should the computing environment 1600 be interpreted as having any dependency or requirement relating to any one or combination of components illustrated in the exemplary operating environment 1600.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 16, an exemplary system for implementing the technology herein includes a general purpose computing device in the form of a computer 1610. Components of computer 1610 may include, but are not limited to, a processing unit 1620, a system memory 1630, and a system bus 1621 that couples various system components including the system memory to the processing unit 1620. The system bus 1621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1610 typically includes a variety of computer readable media. Computer readable media can be any available media that can be accessed by computer 1610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1630 includes computer storage media in the form of volatile and/or nonvolatile memory such as read only memory (ROM) 1631 and random access memory (RAM) 1632. A basic input/output system 1633 (BIOS), containing the basic routines that help to transfer information between elements within computer 1610, such as during start-up, is typically stored in ROM 1631. RAM 1632 typically contains data and/or program modules that are immediately accessible to and/or presently being operated on by processing unit 1620. By way of example, and not limitation, FIG. 16 illustrates operating system 1634, application programs 1635, other program modules 1636, and program data 1637.

The computer 1610 may also include other removable/non-removable, volatile/nonvolatile computer storage media. By way of example only, FIG. 16 illustrates a hard disk drive 1640 that reads from or writes to non-removable, nonvolatile magnetic media, a magnetic disk drive 1651 that reads from or writes to a removable, nonvolatile magnetic disk 1652, and an optical disk drive 1655 that reads from or writes to a removable, nonvolatile optical disk 1656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1641 is typically connected to the system bus 1621 through a non-removable memory interface such as interface 1640, and magnetic disk drive 1651 and optical disk drive 1655 are typically connected to the system bus 1621 by a removable memory interface, such as interface 1650.

The drives and their associated computer storage media discussed above and illustrated in FIG. 16, provide storage of computer readable instructions, data structures, program modules and other data for the computer 1610. In FIG. 16, for example, hard disk drive 1641 is illustrated as storing operating system 1644, application programs 1645, other program modules 1646, and program data 1647. Note that these components can either be the same as or different from operating system 1634, application programs 1635, other program modules 1636, and program data 1637. Operating system 1644, application programs 1645, other program modules 1646, and program data 1647 are given different numbers here to illustrate that, at a minimum, they are different copies. A user may enter commands and information into the computer 160 through input devices such as a keyboard 1662 and pointing device 1661, commonly referred to as a mouse, trackball or touch pad. Other input devices (not shown) may include a microphone, joystick, game pad, satellite dish, scanner, or the like. These and other input devices are often connected to the processing unit 1620 through a user input interface 1660 that is coupled to the system bus, but may be connected by other interface and bus structures, such as a parallel port, game port or a universal serial bus (USB). A monitor 1691 or other type of display device is also connected to the system bus 1621 via an interface, such as a video interface 1690. In addition to the monitor, computers may also include other peripheral output devices such as speakers 1697 and printer 1696, which may be connected through an output peripheral interface 1690.

The computer 1610 may operate in a networked environment using logical connections to one or more remote computers, such as a remote computer 1680. The remote computer 1680 may be a personal computer, a server, a router, a network PC, a peer device or other common network node, and typically includes many or all of the elements described above relative to the computer 1610, although only a memory storage device 1681 has been illustrated in FIG. 16. The logical connections depicted in FIG. 16 include a local area network (LAN) 1671 and a wide area network (WAN) 1673, but may also include other networks. Such networking environments are commonplace in offices, enterprise-wide computer networks, intranets and the Internet.

When used in a LAN networking environment, the computer 1610 is connected to the LAN 1671 through a network interface or adapter 1670. When used in a WAN networking environment, the computer 1610 typically includes a modem 1672 or other means for establishing communications over the WAN 1673, such as the Internet. The modem 1672, which may be internal or external, may be connected to the system bus 1621 via the user input interface 1660, or other appropriate mechanism. In a networked environment, program modules depicted relative to the computer 1610, or portions thereof, may be stored in the remote memory storage device. By way of example, and not limitation, FIG. 16 illustrates remote application programs 1685 as residing on memory device 1681. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for providing image media files, comprising:
automatically establishing default values for a set of criteria for generating a dynamic playlist within a media application, the automatically establishing is performed when the media application is installed, the automatically establishing including:
   setting a first criteria for identifying a set of one or more image files having a user-created rating that satisfies a first threshold;
   setting a second criteria for identifying a set of one or more image files not rated by a user;
   setting a third criteria for identifying a set of one or more image files added to a database during a specified period of time, the first criteria, second criteria and third criteria associated with a dynamically created list of images;
providing an interface that allows a user to edit the default values for the set of criteria for the dynamic playlist;
editing the default values for the set of criteria in response to receiving any edits via the interface, wherein the editing the default values for the set of criteria includes setting the first criteria, setting the second criteria, and setting the third criteria in response to the any edits;
receiving input to associate a favorite playlist for the media application with the dynamic playlist;
receiving a user request to generate content for the favorite playlist;
generating content for the favorite playlist based on the dynamic playlist, wherein the generating content based on the dynamic playlist includes:
   i) constructing a query based on the set of criteria currently in the dynamic playlist only if an initial time period has transpired since the media application was installed;
   ii) running the query against the database to obtain a content list if the query is formed;
   iii) providing content from the content list if the initial time period has transpired; and
   iv) providing content from the database that does not factor in the dynamic playlist if the initial time period has not transpired.

2. The method of claim 1, wherein the specified period of time is configured to end at the time the input is received to provide the favorite playlist based on the dynamically created list of images.

3. The method of claim 1, wherein said step of receiving a user request to generate content for the favorite playlist includes:
   receiving input by an interface provided by an operating system.

4. The method of claim 3, wherein said step of constructing a query is performed by code within the operating system.

5. The method of claim 1, wherein the database is located over a network.

6. A system of providing a list of media files, comprising:
a processing unit; and
computer storage media coupled to the processing unit, the computer storage media having instructions stored therein which, when executed on the processing unit, cause the processing unit to implement a media center application and a media player module, the media center application having a playback engine and a query generator;
the media center application able to set and store a default value for a first criteria for user rating, a default value for a second criteria for non-rated media files, and a default value for a third criteria for a time period threshold during which media files are added to a media database, the first, second, and third criteria for generating a dynamic playlist within the media center application, the media center application sets and stores the default values when the media center application is installed, the media center application provides an interface that allows a user to modify the default values for the first, second, and third criteria, the media center application edits the default values in response to receiving any edits via the interface, wherein the editing the default values for the set of criteria includes setting the first criteria, setting the second criteria, and setting the third criteria in response to the any edits, the media center application provides an interface to associate a favorite playlist for the media application with the dynamic playlist, the media center application receives a user request to generate content for the favorite playlist, the media center application generates content for the favorite playlist based on the dynamic playlist, wherein the generating content based on the dynamic playlist includes:
   i) constructing a query based on the set of criteria currently in the dynamic playlist only if an initial time period has transpired since the media application was installed;
   ii) running the query against the media database to obtain a content list if the query is formed;
   iii) providing content from the content list if the initial time period has transpired; and
   iv) providing content from the media database that does not factor in the dynamic playlist if the initial time period has not transpired.

7. The system of claim 6, wherein the media database is located over a network.

8. The system of claim 6, wherein the playback engine may provide a subset of the media files listed in the query results before each media file is retrieved.

9. The system of claim 6, wherein:
the media database includes audio media data,
the media center application able to set and store a fourth criteria for auto rating and fifth a criteria for most recently added media files,
the query generator able to generate a query based at least one of the fourth criteria and fifth criteria and at least two of the first criteria, second criteria and third criteria.

10. Computer storage media having processor readable code embodied on said computer storage media, said processor readable code for programming one or more processors to perform a method comprising:

automatically establishing default values for a set of criteria for generating a dynamic playlist within a media application, the automatically establishing is performed when the media application is installed;

providing an interface that allows a user to modify the default values for the set of criteria;

editing the default values for the set of criteria in response to receiving any edits via the interface, wherein the editing the default values for the set of criteria in response to receiving any edits via the interface includes setting a first criteria for identifying a set of one or more image files having a user-created rating that satisfies a first threshold, setting a second criteria for identifying a set of one or more image files not rated by a user, and setting a third criteria for identifying a set of one or more image files added to a database during a specified period of time, the first criteria, second criteria and third criteria associated with a dynamically created list of images;

associating a favorite playlist for the media application with the dynamic playlist;

receiving a user request to generate content for the favorite playlist;

generating content for the favorite playlist based on the dynamic playlist, wherein the generating content based on the dynamic playlist includes:

i) constructing a query based on the set of criteria currently in the dynamic playlist only if an initial time period has transpired since the media application was installed;

ii) running the query against a data corpus to obtain a content list if the query is formed;

iii) providing content from the content list if the initial time period has transpired; and iv) providing content from the data corpus that does not factor in the dynamic playlist if the initial time period has not transpired.

11. The computer storage media of claim 10, wherein the associating a favorite playlist for the media application with the dynamic playlist includes:

receiving input through a user interface to set the favorite playlist to the dynamic playlist.

12. The computer storage media of claim 10, wherein the editing the default values for the set of criteria in response to receiving any edits via the interface further includes:

storing a fourth criteria for identifying a set of one or more audio files having a user-created rating that satisfies a first threshold, the set of one or more audio files listed in a data store;

storing a fifth criteria for identifying one or more audio files having an auto rating which satisfies a second threshold;

storing a sixth criteria for identifying a first number of the most recent audio files added to the data store;

storing a seventh criteria for identifying each audio file added to the data store within a first time period.

* * * * *